United States Patent
Goings et al.

Patent Number: 6,101,881
Date of Patent: Aug. 15, 2000

[54] NON-CONTACT LOCKED TERMINAL TESTER

[75] Inventors: Scott Goings, Milford; Timothy Zuraw, Dearborn Heights, both of Mich.

[73] Assignee: UT Automotive Dearborn, Inc., Dearborn, Mich.

[21] Appl. No.: 08/931,059

[22] Filed: Sep. 16, 1997

[51] Int. Cl.⁷ .................................................. G01H 17/00
[52] U.S. Cl. ............................................ 73/646; 340/568
[58] Field of Search ........................... 73/645, 646, 647, 73/648; 340/568

[56] References Cited

U.S. PATENT DOCUMENTS

| | | | |
|---|---|---|---|
| 4,003,264 | 1/1977 | Erlandsson et al. | 73/647 |
| 4,038,866 | 8/1977 | Johnson | 73/654 |
| 4,552,022 | 11/1985 | Durand, III | 73/647 |
| 5,005,415 | 4/1991 | Holroyd | 73/687 |

*Primary Examiner*—Hezron Williams
*Assistant Examiner*—Rose M. Miller
*Attorney, Agent, or Firm*—Howard & Howard

[57] ABSTRACT

A method of determining the quality of insertion of an electrical terminal includes the steps of capturing the sound associated with insertion of the terminal. The terminal is typically inserted into a connector associated with a wire harness. By capturing the sound, the system is able to compare the captured sound to an expected sound. If the captured sound differs from the expected sound then a determination is made that the terminal is not properly inserted.

15 Claims, 1 Drawing Sheet

NON-CONTACT LOCKED TERMINAL TESTER

BACKGROUND OF THE INVENTION

This invention relates to a method and apparatus for testing the quality of insertion of an electrical terminal.

In the prior art, many electrical components are still assembled manually. As one example, wire harnesses are formed by manually arranging wires to various locations on a jig. The wire terminal is also locked into an electrical connector. Many terminals and associate wires are locked into a typical connector. When the wire harness is fully assembled and the connector has received all of the designed terminals some method of testing the quality of terminal insertion is necessary.

Typically, the prior art has utilized some form of electrical test to ensure that all of the terminals do communicate electricity to or from the connector. However, the typical connectors receive a terminal in a sliding connection. In the past, a terminal may sometimes be only partially inserted into the connector body. In some cases, a partially inserted terminal may be inserted sufficiently such that it will communicate electrical signals. Thus, the prior art electrical tests have not been able to always identify an improperly inserted terminal.

If an improper terminal is not discovered at this test stage, then it is possible the wire harness could be assembled into a vehicle.

SUMMARY OF THE INVENTION

In a disclosed embodiment of this invention, a method is utilized for capturing the sound as the terminal is inserted into the connector. The sound will have a predictable pattern if the terminal is properly and fully inserted into the connector. The captured wave is compared to the features of an expected wave by a control system. If the captured wave differs significantly from the expected wave, then the terminal is identified as being faulty.

In a disclosed embodiment of this invention, a microphone is associated with a jig for holding the connector when the terminals are being inserted. The sound of the terminal being inserted into the connector is captured as each terminal is inserted. An analog sound signal passes through a filter to remove unwanted noise. The signal then passes through an analog to digital converter, and then to a control unit such as a CPU. Preferably, the control communicates with a memory in which an expected wave is compared with the captured wave. The control unit is also able to then make a determination of whether the terminal has been properly inserted based upon the comparison. The control unit is further capable of communicating with outputs such as a speaker to replay the sound, or a visual display at which the captured wave can be displayed to an operator.

In embodiments of this invention, the control may serially capture all of the insertion sounds from the terminals in a single connector and then compare all of the captured waves to expected waves prior to determining the quality of each terminal insertion. Alternatively, each terminal can be compared to the expected wave as it is inserted.

Within a single connector, there may be different sizes or types of terminals, and there may be different expected waves. Thus, the control must be able to predict the expected type of terminal being inserted at any particular time have the proper expected sound wave.

These and other features of the present invention can be best understood from the following specification and drawings, the following of which is a brief description.

DETAILED DESCRIPTION OF A PREFERRED EMBODIMENT

Figure 1:
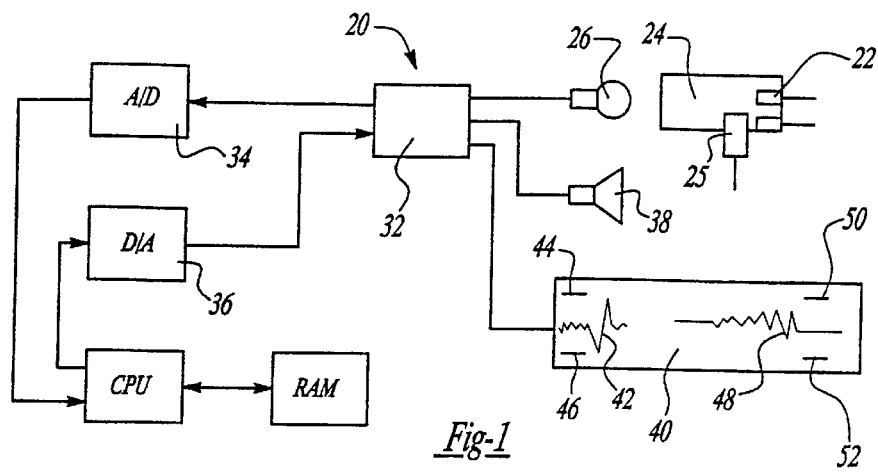
FIG. 1 is a partially schematic view of a testing assembly according to the present invention.

FIG. 1 shows a system 20 for testing the quality of the terminals 22 inserted into a connector 24. Connector 24 and terminals 22 may be of the type typically associated with a wire harness. As shown, a jig 25 holds the connector as the terminals 22 are inserted into the connector 24.

A microphone 26 is positioned adjacent to the jig such that it can capture the sound wave as each terminal 22 is inserted in the connector 24. The waves are typically a plot of volume against time. The wave is compared to expected waves by a control 28. The control 28 may store the expected waves in a random access memory 30. The expected waves may be taught by manually, and fully, inserting terminals. Random access memory 30 may also store the captured signals, should the control be of the sort which will capture all of the terminal insertion signals for a particular connector before comparing the sounds to the expected signals.

As shown, a filter 32 receives the raw analog signal from the microphone 26. Filter 32 removes unwanted noise, etc.

The analog signal then passes to an analog to digital converter 34 which changes the signal into digital form. The control CPU 28 receives the digital signal, and in conjunction with memory 30, compares the signal to an expected signal.

The control 28 also communicates with an output circuit. As shown, the signal may pass through a digital to analog converter 36, and back through the filter 32. A second filter may be utilized for the outlet rather than a single filter 32. The signal then passes to an output mechanism where it can be displayed to the operator. As one example, speaker 38 may play the captured sound for the operator. Alternatively, a visual display 40 may display the wave and compare it to the expected waves. In the illustrated example, the wave 42 associated with the insertion of one terminal 24 is shown. High and low expected extremes 44 and 46 are shown. The particular analysis of this system may be that if the captured wave 42 does not cross both boundaries 44 and 46, then the terminal is not fully inserted.

Each type of terminal will have its own expected targets. Thus, as an example, a second wave 48 associated with a terminal of a different sort than the wave 42 terminal, may have its own boundaries 50 and 52, which are distinct from boundaries 44 and 46.

The use of simple boundaries which are to be crossed by the wave for the terminal to be deemed as being fully inserted is a simplified illustration. In practice, it may be that the entire wave is compared to an expected wave. In such cases, some margin of error for the wave is typically provided. Further, only a component of the captured sound need be used. As an example, if the only comparison is to boundaries, then only the extremes of the sound need be captured.

As stated above, the mere comparison to boundaries is a simplified approach. The actual system might use a more sophisticated test such as calculating the area under the wave, and comparing that area to an expected area. Some margin of err would be allowed for the terminal to be assumed to be properly inserted. However, should the area differ beyond this margin of error, then the terminal will be identified as being improperly inserted. In addition, the actual frequencies of the captured sound could be compared to expected frequencies.

Figure 2:
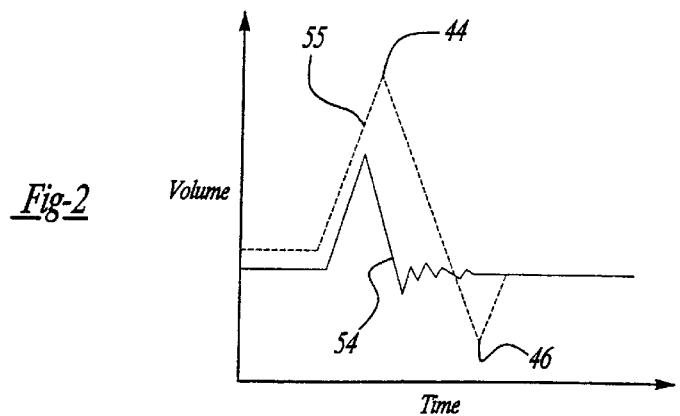
FIG. 2 shows the wave pattern from an improperly inserted terminal.

FIG. 2 again shows the simplified comparison of a wave 54 to a target wave 55, and to the boundaries 44 and 46. Since the wave 54 does not cross the boundaries 44 or 46, then the wave 54 may be associated with the terminal which is faulty. As also shown, the target wave 55 would have a much greater area underneath its curve than the area under the wave 54. This would also lead to the indication that the particular terminal has not been properly inserted.

Figure 3:
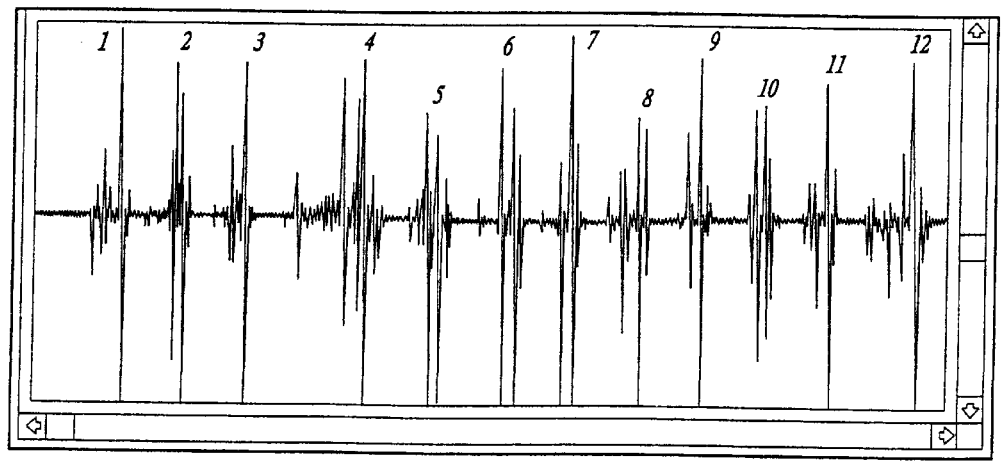
FIG. 3 shows a wave readout from a twelve terminal connector.

The method can be operated such that as each terminal is inserted feedback is provided to the operator on the propriety of that terminal insertion. Alternatively, the system may wait until all of the terminals in a connector are inserted, before displaying to the operator any terminals which would appear to be improperly inserted. The control must be able to predict the type of terminal being inserted at each time. Thus, if a connector is to receive two types of terminals such that there would be two different types of expected signals, then those terminals and their order of insertion must be known to the control. FIG. 3 shows a compressed set of captured signals from a twelve terminal connector. As an example, signals 2 and 3 correspond to the same type terminal. Signal 10, as an example, is of a distinct type terminal.

The exact electrical details associated with this invention are well within the scope of a worker of ordinary skill in the art. The invention may provide the wave form by a sampling rate of 16–44 kHz. Other sample rates may be utilized. The digital analog converter may have an audio band width of between 8 and 22 kHz. The analog digital converter may transform the wave into an 8 bit data signal. Again, the exact electrical details may vary, the main features of this invention are the use of the comparison of the captured sound wave to compare to an expected sound wave and making a prediction about whether the terminal has been properly inserted.

A preferred embodiment of this invention has been disclosed, however, a worker of ordinary skill in the art would recognize that certain modifications would come within the scope of this invention. For that reason, the following claims should be studied to determine the true scope and content of this invention.

We claim:

1. A method of testing proper insertion of an electrical component comprising the steps of:
    (1) inserting an electrical component to a position where said electrical component is to be utilized;
    (2) capturing at least a portion of the sound the component makes when inserted in step (1);
    (3) comparing the captured sound to an expected sound; and
    (4) identifying the inserted component as being improperly inserted if the captured sound differs from the expected sound.

2. A method as recited in claim 1, wherein a margin of error is associated with said identifying the determination of step (4).

3. A method as recited in claim 1, wherein an output is provided to give an operator feedback of the quality of a component insertion.

4. A method as recited in claim 3, wherein said output is visual.

5. A method as recited in claim 3, wherein said output is audio.

6. A method as recited in claim 1, wherein the electrical component is a terminal being inserted into connector associated with a wire harness.

7. A test apparatus for testing the quality of insertion of an electrical component comprising:
    a control for storing an expected sound of an electrical component being inserted into a use location; and
    a device for capturing at least a portion of the sound of said electrical component being inserted into a use position, said device communicating with said control such that said control can compare said captured sound to said expected sound.

8. An apparatus as recited in claim 7, wherein said control includes a computer.

9. An apparatus as recited in claim 8, wherein said computer communicates with a memory, said memory storing said expected sound.

10. An apparatus as recited in claim 8, wherein said device sends said captured sound through an analog to digital converter which converts said captured sound into digital form for use by said computer.

11. An apparatus as recited in claim 8, wherein said control communicates an output signal.

12. An apparatus as recited in claim 11, wherein said output signal is a audio output displayed to an operator.

13. An apparatus as recited in claim 11, wherein said output is a visual display available to an operator.

14. An apparatus as recited in claim 7, wherein said electrical component is a terminal being inserted into connector associated with a wire harness.

15. A method of testing the quality of electrical terminals inserted into a connector comprising the steps of:
    (1) mounting a connector and inserting terminals into said connector;
    (2) capturing at least components of the insertion sound during step (1), communicating said captured sound to a control;
    (3) comparing said captured sound to an expected sound;
    (4) determining whether said captured sound differs from said expected sound; and
    (5) providing an output to an operator indicative of the results of step (4).

* * * * *